(12) United States Patent
Wideman

(10) Patent No.: US 8,381,020 B1
(45) Date of Patent: Feb. 19, 2013

(54) METHOD AND APPARATUS FOR FACILITATING CONTROL INTERFACE FAILOVER IN A REMOVABLE MEDIA STORAGE DEVICE

(75) Inventor: Roderick B. Wideman, Shakopee, MN (US)

(73) Assignee: Quantum Corporation, San Jose, CA (US)

( * ) Notice: Subject to any disclaimer, the term of this patent is extended or adjusted under 35 U.S.C. 154(b) by 436 days.

(21) Appl. No.: 12/657,658

(22) Filed: Jan. 25, 2010

(51) Int. Cl.
*G06F 11/00* (2006.01)
(52) U.S. Cl. ............ 714/6.11; 714/6.1; 714/6.2; 714/42
(58) Field of Classification Search .................. 714/6.1, 714/6.11, 25, 6.2, 42
See application file for complete search history.

(56) References Cited

U.S. PATENT DOCUMENTS

| | | | | |
|---|---|---|---|---|
| 6,725,394 B1 * | 4/2004 | Bolt | | 714/5.11 |
| 2002/0199077 A1 * | 12/2002 | Goodman et al. | | 711/202 |
| 2007/0162656 A1 * | 7/2007 | Bryan et al. | | 710/38 |

OTHER PUBLICATIONS

"Fibre Channel" Link Services (FC-LS) Rev. 1.62; INCITS working draft proposed American National Standard for Information Technology; ICITS xxx-200x, T11/Project 1620-D/Rev 1.62, Dec. 4, 2006; pp. 1-210.

* cited by examiner

*Primary Examiner* — Scott Baderman
*Assistant Examiner* — Sarai Butler
(74) *Attorney, Agent, or Firm* — Roeder & Broder LLP; James P. Broder

(57) ABSTRACT

A method and apparatus for facilitating control interface failover in a media storage device is described. In one embodiment, the method couples a media changer device to a plurality of removable media storage drives, where each removable media storage drive comprises a first port having a first port name and assigns a second port name to either the first port or to a second port of a first removable media storage drive in the plurality of removable media storage drives, where the second port name comprises at least a portion of portable identity data. The method preserves the portable identity data to be utilized during a control interface failover process to transfer the second port name from the first removable media storage drive to a second removable media storage drive in the plurality of removable media storage drives.

20 Claims, 4 Drawing Sheets

US 8,381,020 B1

METHOD AND APPARATUS FOR FACILITATING CONTROL INTERFACE FAILOVER IN A REMOVABLE MEDIA STORAGE DEVICE

BACKGROUND OF THE INVENTION

1. Field of the Invention

Embodiments of the present invention generally relate to storage system management and, more particularly, to a method and apparatus for facilitating control interface failover in a removable media storage device.

2. Description of the Related Art

A plurality of computers can be configured with various software programs and hardware devices. These computers may communicate with one or more data storage devices (e.g., removable media storage devices, such as automated tape libraries) through a computer network. The data storage devices may implement numerous technologies (e.g., Fibre Channel, SCSI and/or the like) to facilitate the transmission and storage of the data. These data storage devices also utilize various software modules that partition various physical resources (e.g., storage slots, data transfer elements (e.g., drives), controllers, medium transfer elements (e.g., a picker, an accessor and/or any other robotic assembly), magnetic tapes, optical disks and/or the like) into a plurality of logical units (e.g., logical devices that are identified by LUNs). For example, a single tape library system may be partitioned into one or more media changer devices which are presented to one or more hosts as proxies for tape library control software (e.g., a SCSI media changer device server).

Furthermore, these software modules perform various storage tasks and also provide an interface, referred to as a control interface, to a certain media changer device, through which storage system commands (e.g., SCSI media changer commands) and corresponding responses are exchanged. The software modules (e.g., device control software) execute one or more commands for operating the media changer device (i.e., media changer commands). These commands instruct one or more robotic mechanisms to move the removable media (e.g., magnetic tapes) in and out of one or more removable media storage drives (e.g., tape drives).

A removable media storage drive forms a logical path, referred to as a control path, to the interface through which a server sends media changer device commands to control one or more logical units, such as a media changer device. The tape drive may also form a data path to one or more magnetic tapes to which the hosts store the data. For example, a storage system consisting of a host (e.g., a desktop computer) that is connected to a removable media storage device having two or more removable media storage drives (e.g., magnetic tape drives) also includes two host bus adapters (e.g., SCSI controllers) that are connected to a first and a second control port, respectively. This storage system forms two physical control paths to the media changer device for redundancy, if one control path from an adaptor to the controller component fails. Maintaining redundant control paths is a host-based failover solution.

SUMMARY OF THE INVENTION

Embodiments of the present invention generally include a method and apparatus for facilitating control interface failover in a removable media storage device. In one embodiment, the method couples a media changer device to a plurality of removable media storage drives, where each removable media storage drive comprises a first port having a first port name and assigns a second port name to either the first port or to a second port of a first removable media storage drive in the plurality of removable media storage drives, where the second port name comprises at least a portion of portable identity data. The method preserves the portable identity data to be utilized during a control interface failover process to transfer the second port name from the first removable media storage drive to a second removable media storage drive in the plurality of removable media storage drives.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
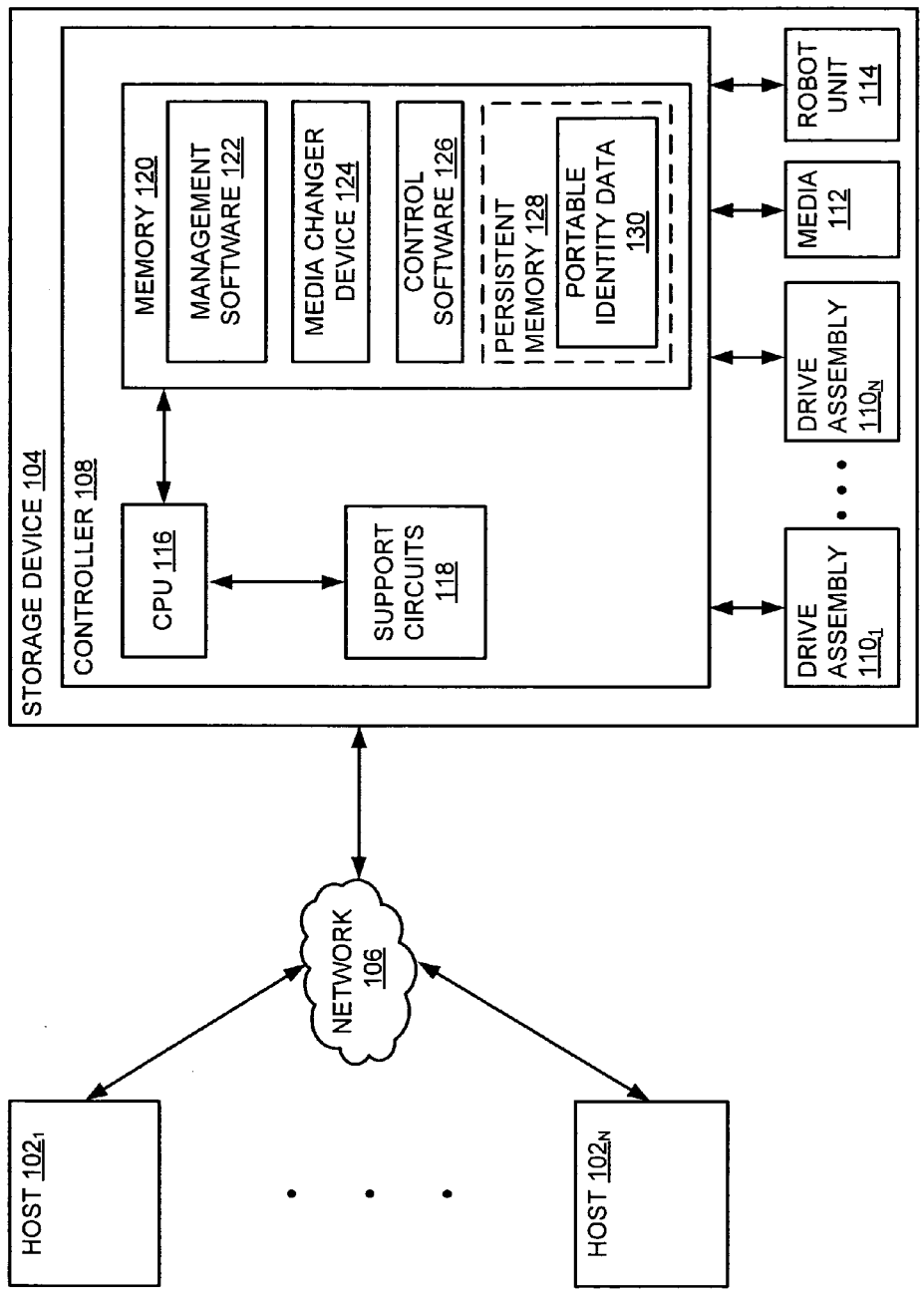
FIG. 1 is a block diagram of a system for facilitating control interface failover in a storage device according to one or more embodiments of the present disclosure.

FIG. 1 is a block diagram of a system 100 for facilitating control interface failover in a storage device according to one or more embodiments. The system 100 includes a plurality of hosts 102 and a storage device 104 that are coupled to each other through a network 106.

Each of the plurality of hosts 102 (host computers) may be a type of computing device (e.g., a rackmounted server, a desktop computer, and/or the like), such as those generally known in the art. As explained further below, software applications running in a host 102 can communicate (e.g., using standards including but not limited to SCSI) to the storage device 104 in order to read and/or write data that is stored within removable media (e.g., magnetic tape). These communications may include information indicating a target port (e.g., a worldwide port name in Fibre Channel), a target device, such as an address that identifies a tape drive (e.g., a SCSI target ID or a controller) and a logical device (e.g., a logical unit number (LUN)).

The storage device 104 generally includes various hardware and/or software for managing resources within the system 100. The storage device 104 may include one or more removable media storage drives (e.g., hard disk drives, optical drives, magnetic tape drives and/or the like) and software modules that provide an interface (e.g., Integrated Drive Electronics/AT Attachment (IDE/ATA), Small Computer Systems Interface (SCSI) and/or the like) for the hosts 102. The storage device 104 may be an automated removable media library, such as an automated tape library according to some embodiments. Various components within the storage device 104 move magnetic tape cartridges in and out of storage slots for the purpose of storing and accessing data as explained further below.

The network 106 comprises a communication system that connects computers by wire, cable, fiber optic and/or wireless link facilitated by various types of well-known network elements, such as hubs, switches, routers, and the like. The network 106 may employ various well-known protocols to communicate information amongst the network resources. For example, the network 106 may communicate with the Internet using various communications infrastructure such as Ethernet, WiFi, WiMax, General Packet Radio Service (GPRS), and the like.

The storage device 104 includes a controller 108, one or more drive assemblies 110, media 112 and a robot unit 114. Each of the drive assemblies 110 generally includes housing for securing a removable media storage device, such as a tape drive. The media 112 may include various removable media (e.g., hard disks, optical disks, magnetic tape cartridges and/or the like). In some embodiments, the control software 126 within the controller 108 instructs the robot unit 114 to move the various removable media in and out of the data transport element in response to one or more SCSI media changer commands (e.g., A MOVE MEDIUM command).

One or more tape drives may be presented to the hosts 102 as SCSI target devices on one or more physical ports. In some embodiments, the tape drives provide sequential access functionality to data stored in magnetic tape cartridges. These magnetic tape cartridges may be utilized by one or more tape library partitions. Each of these partitions may include one or more tape drives, one or more storage elements (slots), one or more media transport elements (e.g., a robotics unit, such as a picker) and one or more import/export elements (not pictured). The media transport element moves one or more magnetic tape cartridges from storage elements into the tape drives. In some embodiments, the tape library partitions may be addressed as logical devices, such as media changer devices, using Logical Unit Numbers (LUNs). The tape drives may be bridged to the media changer devices to which the tape drives forward messages, commands and/or the like from the hosts 102.

The robot unit 114 may include one or more medium transport elements that mechanize the movement of removable media to and from a physical drive that records on or reads from the removable media. The controller 108 includes a CPU 116, various support circuits 118 and a memory 120. The CPU 116 may comprise one or more commercially available microprocessors or microcontrollers that facilitate data processing and storage. The various support circuits 118 facilitate operation of the CPU 116 and may include clock circuits, buses, power supplies, input/output circuits and/or the like. The memory 120 includes read only memory, random access memory, disk drive storage, optical storage, removable storage, and the like.

The memory 120 includes management software 122 (e.g., processor executable instructions), for configuring logical devices, controlling access to the media 112 and performing various storage tasks. In some embodiments, the management software 122 can be used to create one or more logical devices that represent storage device partitions. The logical devices operate as proxies for various physical resource groupings, such as tape drives, magnetic tape cartridges, storage slots and/or the controller 108. In some embodiments, a media changer device 124 is a logical device that operates as a proxy for control software 126 running within the controller 108 as explained further below. Alternatively, the media changer device 124 may be a microprocessor based embedded controller component for controlling the robot unit 114.

The management software 122 presents the logical devices to the hosts 102 as target devices, such as media changer devices and tape drive devices. The management software 122 may also configure one or more interfaces to the logical devices, such as a control interface between the media changer device 124 and the hosts 102. The control interface (or control path) includes each hardware interface that connects the host 102 with the storage device 104. For example, a target port (e.g., a Fibre Channel port) on a tape drive forms a portion of the control interface to the media changer device 124.

The controller 108 utilizes various software modules for controlling system components, such as the drive assemblies 110, the media 112 and/or the robot unit 114. According to some embodiments, the memory 120 further includes the control software 126, which provides high level control functionality over magnetic tape cartridge movement. For example, the control software 126 issues instructions to one or more motor assemblies (not pictured) when x-axis or y-axis motion is required to perform a media changer command (e.g., a Small Computer Systems Interface (SCSI) Media changer command). The control software 126 may also issue instructions to the robot unit 114 in order to load and unload magnetic tape cartridges between storage slots and the tape drives.

In some embodiments, the control software 126 includes software code (e.g., processor executable instructions) for operating various features of the controller 108. The control software 126 may be a device server that executes storage system commands (e.g., SCSI Media changer device (SMC) commands) that are communicated by the hosts 102. The control software 126 operates the robot unit 114 in accordance with these storage system commands. In response, the robot unit 114 proceeds to move various portions of the media 112 according to one or more embodiments. For example, the control software 126 may instruct one or more robotic assemblies to load and/or unload a particular magnetic tape cartridge into a tape drive.

The memory 120 optionally includes persistent memory 128 for storing portable identity data 130 associated with a target port and/or a target logical device, such as the media changer device 124. The persistent memory 128 generally refers to storage architecture for providing long-term, reliable retention of data. The persistent memory 128 may be an area of the memory 120 that preserves the portable identity data 130 through system failures. The management software 122 may establish the portable identity data 130 during installation or manufacture of the storage device 104.

In some embodiments, the portable identity data 130 includes one or more consistent and distinct identifiers associated with the media changer device 124, such as a unique port name and/or a unique node name, that are transferable between various ones of a plurality of tape drives. In some embodiments, the unique port name, such as a worldwide port name, is reserved for a target port associated with the media changer device 124. In addition, the unique node name, such as a worldwide node name, identifies the media changer device 124 to the hosts 102. In some embodiments, the unique node name and the unique port name are derived from a master identity associated with the storage device 104 as a whole system as explained further below.

Furthermore, the portable identity data 130 differs from corresponding identifiers associated with any of the plurality of tape drives. Storing the portable identity data 130 in the persistent memory 128 maintains consistent identifier assignment. Associating the unique port name and/or the unique node name with the media changer device 124 prevents the unique node name and/or the unique port name from being assigned to any of the plurality of tape drives or another media changer device or from being confused with another identifier. Alternatively, the portable identity data 130 may be preserved by applying a hard-coded algorithm to the master identity. Even if the media changer device 124 fails over from a tape drive to another tape drive, the hosts 102 continue to use the media changer device 124 by recognizing the unique port name and the unique node name on another port.

The management software 122 assigns the unique port name to a port (e.g., a physical port or a virtual port) that is configured to be the target port for the media changer device 124 as a proxy for the control software 126 within the controller 108. The portable identity data 130 may further include a unique node name, such as a worldwide node name, that is assigned to the media changer device 124. The management software 122 communicates the unique node name and the unique port name to a tape drive that is bridged to the media changer device 124 to which the tape drive forwards storage system commands from the hosts 102. During a device discovery process, the hosts 102 detect a direct port to the media changer device 124 but do not recognize the tape drive operating as a proxy according to one or more embodiments.

Figure 2:
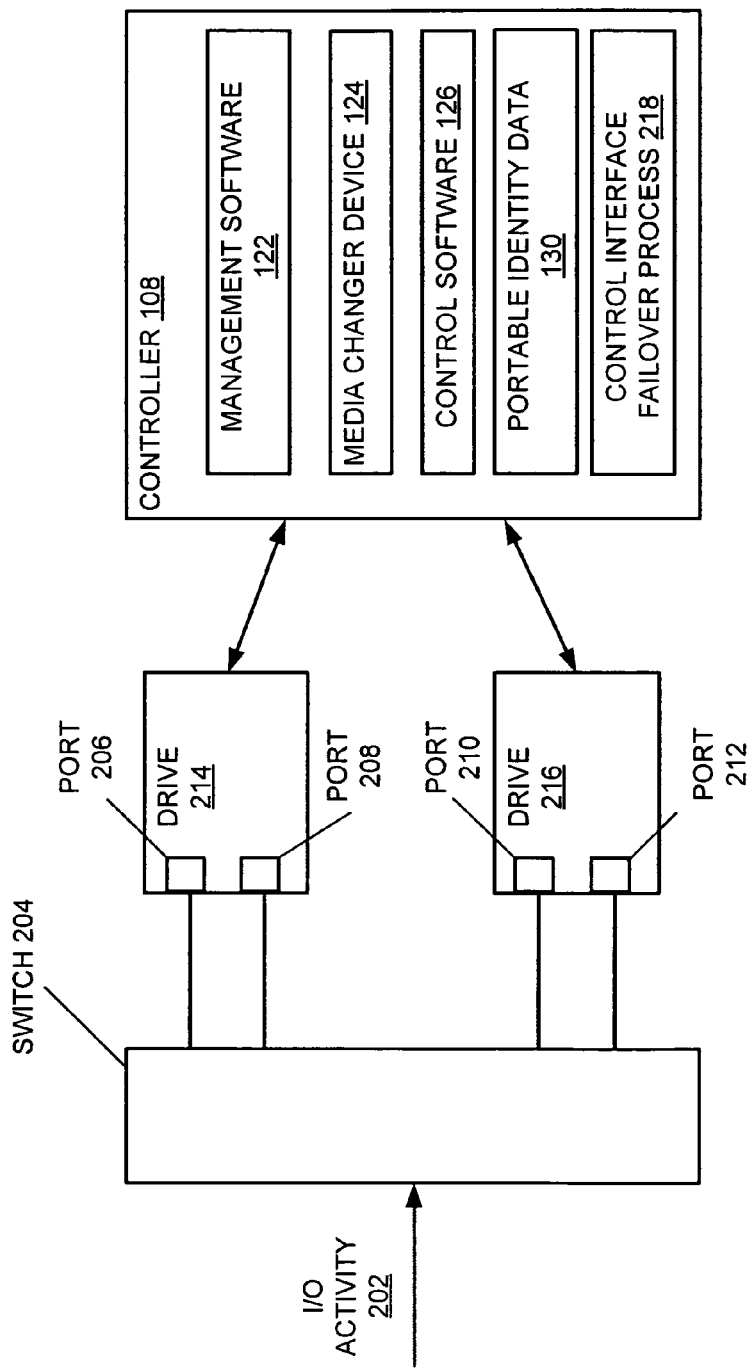
FIG. 2 is a functional block diagram of a system for facilitating control interface failover according to one or more embodiments of the present disclosure.

FIG. 2 is a functional block diagram of a system 200 that performs a control interface failover using portable identity data according to one or more embodiments. The system 200 receives input/output (I/O) activity 202 that is communicated by one or more hosts and directed to one or more logical devices, such as the media changer device 124. The I/O activity 202 includes storage system commands (e.g., SCSI Media Changer (SMC) commands) for loading and/or unloading removable media in and out of drives and/or storage slots for the purpose of reading and/or writing data and/or the like.

The hosts initially communicate the I/O activity 202 to a switch 204, which forwards the storage system commands through one or more ports, such as a port 206, a port 208, a port 210 and/or a port 212, to a requested device, such as a drive 214, a drive 216 and/or the controller 108. In some embodiments, the switch 204 may be a networking component that processes the I/O activity 202 and selects a target port that maps to the requested device for transmitting the storage system commands. In some embodiments, the port 206 and/or the port 208 may be configured to be target ports to the drive 214. Similarly, the port 210 and the port 212 may be configured to be target ports to the drive 216. In addition, the port 206, the port 208, the port 210 and/or the port 212 may be configured to be target ports to the controller 108.

As described in the present disclosure, the media changer device 124 may be a logical device representing the control software 126, which operates assemblies for releasing, moving and/or accessing magnetic tape cartridges according to some embodiments. The storage system commands as well as responses pass through the particular tape drive via the target port for the media changer device 124 (i.e., the control interface). For example, the control software 126 executes one or more SCSI Media Changer commands that require motion including calibrations, magnetic tape cartridge movement and/or inventory updates. Because the media changer device 124 is bridged to the particular tape drive and cannot directly access any of the hosts, a particular tape drive serves as a proxy for communications between the controller 108 and the hosts.

In some embodiments, the controller 108 includes portable identity data 130 as well as an instance of the management software 122. In some embodiments, the management software 122 configures the drive 214 to be a portion of the control interface to the media changer device 124 within the controller 108. For example, the management software 122 configures the port 206 to be a target port for portions of the I/O activity 202 that are directed to the media changer device 124. When the controller 108 receives such portions of the I/O activity 202, the management software 122 processes one or more storage system commands for operating the media changer device 124 and determines one or more physical elements that map to one or more logical elements associated with the media changer device 124. The control software 126 proceeds to execute these storage system commands using the physical elements.

Using the portable identity data 130, the management software 122 instructs the drive 214 to create a virtual port through which the hosts communicate media changer commands according to one or more embodiments. The virtual port is presented to the hosts through a physical port, such as the port 206. In some embodiments, the management software 122 configures the virtual port with a unique port name (e.g., a worldwide port name (WWPN)) that is established for the media changer device 124. The hosts use the unique port name to identify the virtual port as a target port for the media changer device 124. The management software 122 also establishes a unique node name that identifies the media changer device 124 to the hosts. The switch 204 makes the virtual port visible to the hosts as the target port through the port 206.

In some embodiments, the management software 122 activates the port 208 as a secondary physical port to the drive 214. The management software 122 utilizes the portable identity data 130 to configure the port 208 as a target port to the media changer device 124. For example, the management software 122 communicates a unique port name (e.g., a worldwide port name (WWPN)) to the drive 214, which assigns the unique port name to the port 208. To the switch 204, the unique port name corresponds with a device that is connected to a physical port. Furthermore, the management software 122 communicates a unique node name to the drive 214 for assignment to the port 208 in order to present the media changer device 124 as a target device to the hosts.

In response to a system failure, the management software 122 initiates a control interface failover process 218 in order to migrate the media changer device 124 from the drive 214 to the drive 216. In some embodiments, the drive 214 and the drive 216 may be tape drives located within a same fabric zone. The system failure may occur when the drive 214 stops operating properly or loses a network connection with the controller 108 according to some embodiments. To accomplish the control interface failover, the management software 122 instructs the drive 214 to release the media changer device 124 and then bridges the media changer device 124 with the drive 216. For example, the management software 122 may create a communication link between the controller 108 and the drive 216. Using the portable identity data 130, the management software 122 configures the port 210 or the port 212 to be a target port to the media changer device 124 for the hosts.

In some embodiments, the management software 122 instructs the drive 216 to virtualize a physical port (e.g., an N_Port), such as the port 210, in order to add a virtual port (e.g., a unique N_Port_ID). Then, the drive 216 provides the unique port name to the switch 204 in order to configure the virtual port to be a target port to the media changer device 124. Once the hosts discover the media changer device 124 to be available, the I/O activity 202 is communicated to the drive 216 via the virtual port that is shared on the port 210. In another embodiment, the management software 122 instructs the drive 216 to enable the port 212 as a second primary port to the drive 216 and configure the port 212 to be a target port for the media changer device 124 using the unique port name. Through the port 212, the hosts communicate storage system commands to operate the media changer device 124 through the second primary port, which may be referred to as the control interface.

Figure 3:
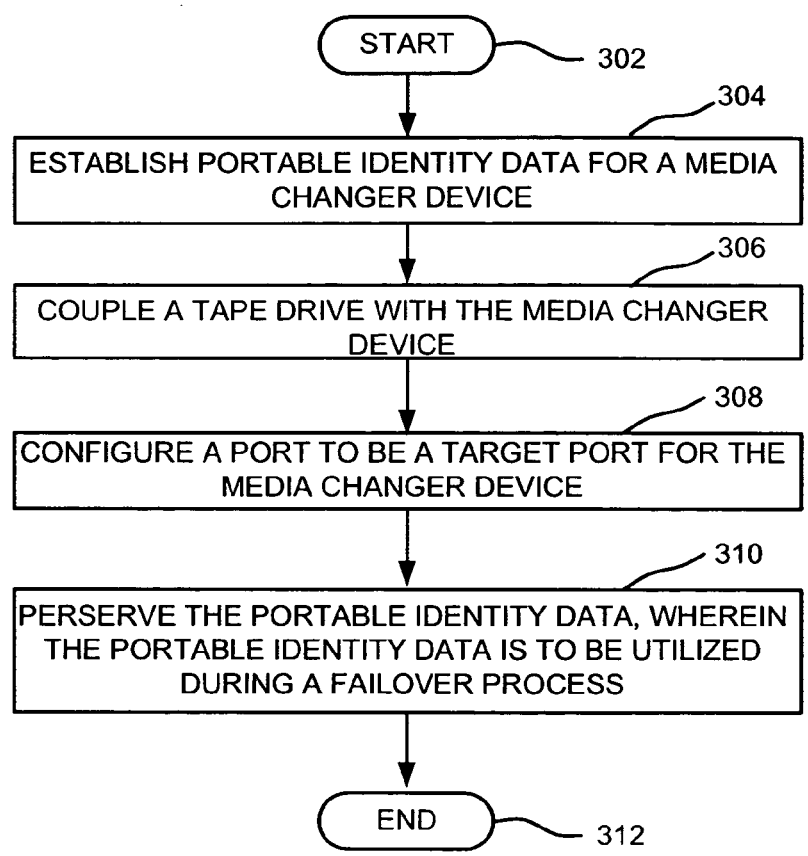
FIG. 3 is a flow diagram of a method for facilitating control interface failover in a storage device according to one or more embodiments of the present disclosure.

FIG. 3 is a flow diagram depicting a method 300 for facilitating control interface failover in a removable media storage device according to one or more embodiments. The method 300 starts at step 302 and proceeds to step 304 at which portable identity data (e.g., the portable identity data 130 of FIG. 1) is established for a media changer device (e.g., the media changer device 124 of FIG. 1). In some embodiments, the media changer device is a logical target device that serves as a proxy for control software (e.g., the control software 126 of FIG. 1) associated with a library system controller (e.g., the controller 108 of FIG. 1). The control software may be a device server (e.g., a SMC device server) for executing storage system commands and communicating responses to one or more hosts.

At step 306, a tape drive is coupled with the media changer device. For example, management software may bridge the media changer device to the tape drive, which allows the tape drive to provide a control interface on a drive port. The tape drive forwards the storage system commands (e.g., SMC commands) to the media changer device. In some embodiments, the tape drive communicates the storage system commands to the library system controller where the management software identifies one or more physical elements corresponding with one or more logical elements that define the media changer device. For example, the media changer device may include a particular logical tape drive that maps to a certain physical tape drive. Then, the management software invokes the control software to execute these commands using the corresponding physical elements. The control software, in accordance with these commands, instructs various robotic units to load and/or unload one or more magnetic tape cartridges within one or more tape drives.

At step 308, a port is configured to be a target port for the media changer device. The port may be a virtual port that is presented to one or more hosts through a physical port and functions as a primary port for communicating with the media changer device. A unique port name associated with the virtual port differs from a port name associated with a primary port for the tape drive. As such, the tape drive and the media changer device share the physical port using independent and unique port names. In some embodiments, the management software instructs the tape drive to virtualize a port by adding a distinct virtual port identifier (e.g., a N_Port_ID for Fibre Channel N_Port ID Virtualization (NPIV)) to a physical port. Alternatively, the port may be a second physical port associated with the tape drive. In some alternate embodiments, the management software may assign the unique port name to the second physical port forming the control interface to the media changer device via the tape drive. Accordingly, the hosts communicate with the media changer device through the second physical port.

At step 310, the portable identity data is preserved in order to be utilized during a control interface failover process. As such, the portable identity data includes distinct and consistent identifiers for the media changer device. In some embodiments, the portable identity data is stored in persistent memory (e.g., the persistent memory 128 of FIG. 1). In another embodiment, the portable identity data is regenerated before each control interface failover. For example, the management software computes a unique port name and/or a unique node name to be offsets of a master identity (e.g., a logical partition serial number or worldwide name). Because the master identity is hard-coded into the library system controller and cannot be changed, the management software computes a same unique port name and/or a same unique node name for the media changer device. At step 312, the method 300 ends.

Figure 4:
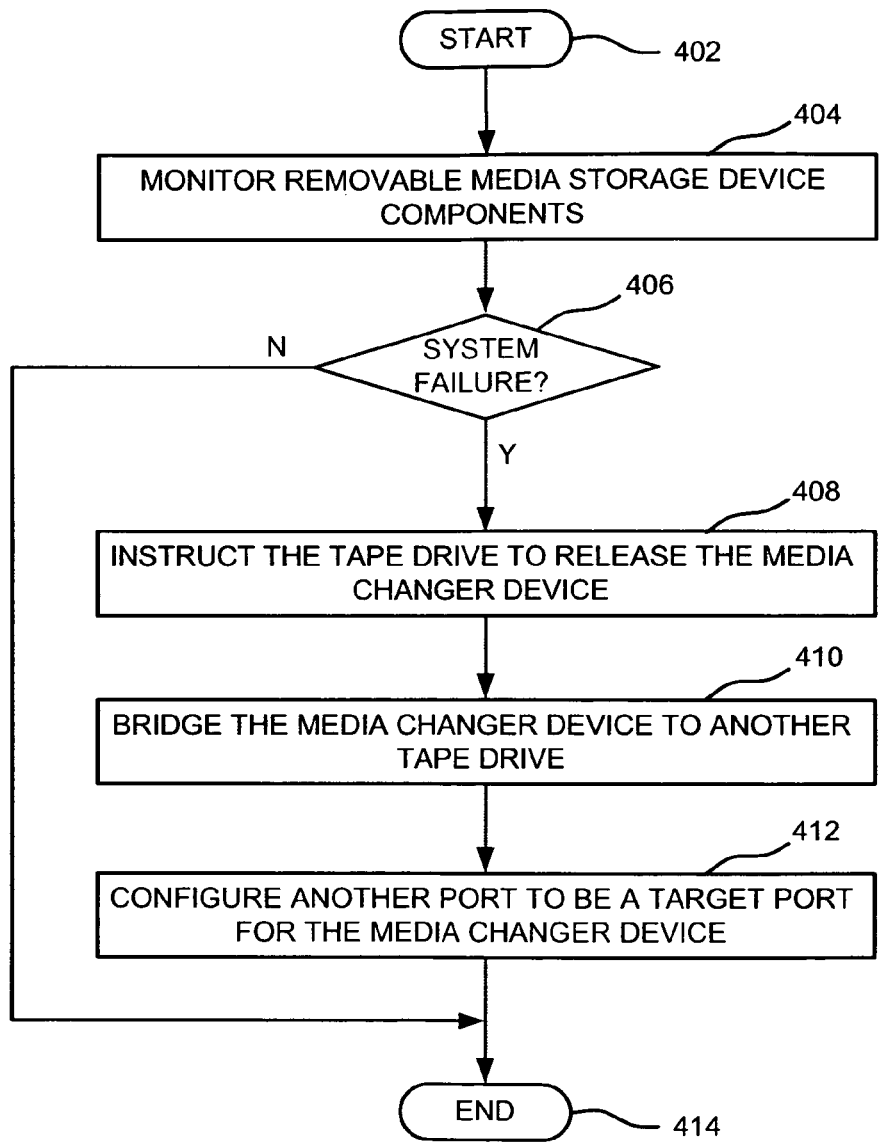
FIG. 4 is a flow diagram of a method for migrating a media changer device from a tape drive to another tape drive according to one or more embodiments of the present invention.

FIG. 4 is a flow diagram of a method 400 for migrating the media changer device from a tape drive to another tape drive during a control interface failover process according to one or more embodiments. The method 400 starts at step 402 and proceeds to step 404.

At step 404, one or more removable media storage device components are monitored. For example, management software (e.g., the management software 122 of FIG. 1) monitors network connections between hosts and each and every removable media storage drive (e.g., tape drive). At step 406, the method 400 queries whether a system failure disrupts storage system command communications through the control interface between a host and the media changer device via the tape drive. If the system failure does not disrupt the storage system command communications, the method 400 proceeds to step 414. If, on the other hand, the system failure does disrupt the storage system command communications, the method 400 proceeds to step 408.

In some embodiments, the management software detects a connectivity loss between the hosts and/or a switch and the removable media storage drive such that storage system commands do not reach control software (e.g., the control software 126 of FIG. 1) for operating the media changer device. For example, the management software determines whether a communication link still exists on a Fibre Channel. In another embodiment, the management software detects a connectivity loss between the tape drive and the library system controller. For example, the management software determines that an Ethernet and/or serial connection to the library system controller is disconnected and/or lost. As another example, the management software determines that the tape drive is damaged and/or dysfunctional. In order to provide a highly available media changer device to the hosts, the management software initiates a control interface failover process, which migrates the media changer device from the tape drive to another tape drive using the portable identity data as described throughout the present disclosure.

At step 408, the tape drive is instructed to release the media changer device. At step 410, the media changer device is bridged with another tape drive. In some embodiments, the management software communicates the portable identity data to the other tape drive. In order to establish the portable identity data on the other tape drive, the management software may issue a SCSI command (e.g., a SET SMC WWN command) that provides the unique node name and the unique port name. At step 412, another port is configured to be a target for the media changer device. In some embodiments, the other port may be a virtual port that shares a physical port with the other tape drive. In some embodiments, the other port may be a second physical port assigned to the other tape drive where a first physical port forms a data path to the other tape drive. At step 414, the method 400 ends.

While the foregoing is directed to embodiments of the present invention, other and further embodiments of the invention may be devised without departing from the basic scope thereof, and the scope thereof is determined by the claims that follow.

The invention claimed is:

1. A computer implemented method to facilitate control interface failover in a removable media storage device, comprising:

coupling a media changer device to a plurality of removable media storage drives, where each removable media storage drive comprises a first port having a first port name;

assigning a second port name to either the first port or to a second port of a first removable media storage drive in the plurality of removable media storage drives, where the second port name comprises at least a portion of portable identity data; and preserving the portable identity data to be utilized during a control interface failover process to transfer the second port name from the first removable media storage drive to a second removable media storage drive in the plurality of removable media storage drives.

2. The method of claim 1, further comprising communicating storage system commands from a host computer to the media changer device using the second port name and communicating other information to the first removable media storage drive using the first port name.

3. The method of claim 2 further comprising, in response to a system failure that disrupts storage system command communications, migrating the media changer device to another removable media storage drive using the portable identity data, wherein the host computer communicates with the media changer device through a first or second port of the second removable media storage device.

4. The method of claim 3, wherein migrating the media changer device further comprises:

releasing the media changer device from the first removable media storage device;

bridging the media changer device to the second removable media storage device; and configuring, using the portable identity data, the first port or second port to be a target port for the host computer to communicate with the media changer device.

5. The method of claim 4, wherein, if the first port is the target port, configuring the first port further comprises:

adding a virtual port to a physical port using N_Port ID Virtualization; and assigning the second port name to the virtual port.

6. The method of claim 4 further comprising communicating the portable identity data to the second removable media storage device.

7. The method of claim 1, wherein assigning further comprises, if the first port is assigned the second port name, creating a virtual port to enable the first port to be assigned both the first port name and the second port name.

8. The method of claim 1, wherein preserving the portable identity data further comprises storing the portable identity data in persistent memory, wherein the portable identity data is to be used to migrate the media changer device to the second removable media storage drive during a control interface failover process.

9. A computer-readable-storage device comprising one or more processor-executable instructions that, when executed by at least one processor, causes the at least one processor to perform a method comprising:

coupling a media changer device to a plurality of removable media storage drives, where each removable media storage drive comprises a first port having a first port name;

assigning a second port name to either the first port or to a second port of a first removable media storage drive in the plurality of removable media storage drives, where the second port name comprises at least a portion of portable identity data; and preserving the portable identity data to be utilized during a control interface failover process to transfer the second port name from the first removable media storage drive to a second removable media storage drive in the plurality of removable media storage drives.

10. The computer-readable-storage device of claim 9 further comprising one or more processor-executable instructions that, when executed by the at least one processor, causes the at least one processor to perform the method further comprising, in response to a system failure that disrupts storage system command communications, migrating the media changer device to another removable media storage drive using the portable identity data, wherein a host computer communicates with the media changer device through a first or second port of the second removable media storage device.

11. The computer-readable-storage device of claim 10 further comprising one or more processor-executable instructions that, when executed by the at least one processor, causes the at least one processor to perform the method, wherein migrating the media changer device further comprises:

releasing the media changer device from the first removable media storage device;

bridging the media changer device to the second removable media storage device; and configuring, using the portable identity data, the first port or second port to be a target port for the host computer to communicate with the media changer device.

12. The computer-readable-storage device of claim 11 further comprising one or more processor-executable instructions that, when executed by the at least one processor, causes the at least one processor to perform the method, wherein, if the first port is the target port, configuring the first port further comprises:

adding a virtual port to a physical port using N_Port ID Virtualization; and assigning the second port name to the virtual port.

13. The computer-readable-storage device of claim 9 further comprising one or more processor-executable instructions that, when executed by the at least one processor, causes the at least one processor to perform the method further comprising communicating the portable identity data to the second removable media storage device.

14. The computer-readable-storage device of claim 9 further comprising one or more processor-executable instructions that, when executed by the at least one processor, causes the at least one processor to perform the method, wherein assigning further comprises, if the first port is assigned the second port name, creating a virtual port to enable the first port to be assigned both the first port name and the second port name.

15. The computer-readable-storage device of claim 9 further comprising one or more processor-executable instructions that, when executed by the at least one processor, causes the at least one processor to perform the method, wherein preserving the portable identity data further comprises storing the portable identity data in persistent memory, wherein the portable identity data is to be used to migrate the media changer device to the second removable media storage drive during a control interface failover process.

16. An apparatus for storing data, comprising:

a first removable media storage drive comprising a first port having a first port name;

a second removable media storage drive comprising a second port having a second port name;

a controller, coupled to the first removable media storage drive and the second removable media storage drive, for managing operation of the first removable media storage drive and the second removable media storage drive;

a media changer device, defined by the controller, for controlling the first removable media storage drive and the second removable media storage drive, where the media changer device assigns a third port name to either the first port or to another port of the first removable media storage drive, where the third port name comprises at least a portion of portable identity data, and preserving the portable identity data to be utilized during a control interface failover process to transfer the third port name from the first removable media storage drive to the second removable media storage drive.

17. The apparatus of claim 16 wherein the first port name and second port name are used for respectively communicating information from a host computer to the first removable media storage drive and the second removable media storage drive, and the third port name is used for communicating storage system commands from a host computer to the media changer device.

18. The apparatus of claim 16 wherein the controller virtualizes the first port to enable the first port name and the third port name to share the same port.

19. The apparatus of claim 18 wherein the controller virtualizes the first port using N_Port ID Virtualization.

20. The apparatus of claim 16 further comprising persistent memory for storing the portable identity data.

* * * * *